Aug. 5, 1958 — E. J. FRITZ — 2,846,231
FASTENER MEANS FOR VEHICLE GAS TANK
Filed Oct. 5, 1956
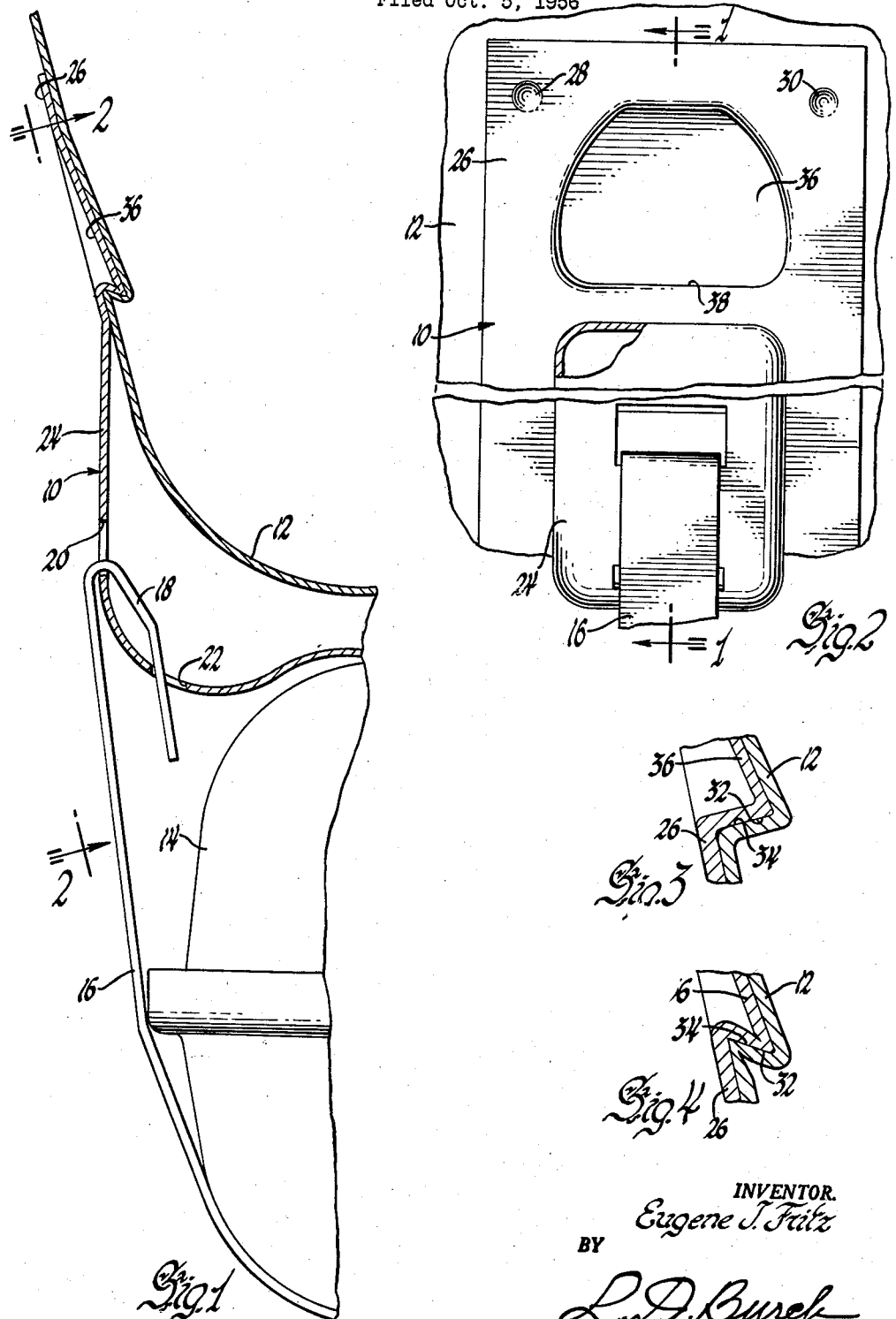
INVENTOR.
Eugene J. Fritz
BY
L. D. Burch
ATTORNEY United States Patent Office 2,846,231
Patented Aug. 5, 1958

2,846,231

FASTENER MEANS FOR VEHICLE GAS TANK

Eugene J. Fritz, Detroit, Mich., assignor to General Motors Corporation, Detroit, Mich., a corporation of Delaware Application October 5, 1956, Serial No. 614,122

4 Claims. (Cl. 280—5)

This invention relates to fasteners generally and more particularly to the method of fastening two members together.

Numerous different fastener means and methods have been devised and suggested in the past.

It is here proposed to fasten two members together by a method requiring no materials other than that of the two members themselves. This particular method of fastening members together is particularly adaptable for securing a hanging type bracket to a substantially vertical supporting wall.

In the drawings:

Figure 1 is a cross-sectioned side view of a bracket secured to a supporting wall by the fastener method herein disclosed.

Figure 2 is a front view of the supporting wall and bracket members of Figure 1 taken in the plane of line 2—2 therein.

Figure 3 is an enlarged cross-sectioned view of one of the steps of the method herein disclosed.

Figure 4 is an enlarged cross-sectioned view of another of the steps of the proposed fastener method.

The drawings disclose this invention as practiced in securing a gas tank retaining strap bracket 10 to the underbody 12 of an automotive vehicle.

The gas tank 14 is disposed beneath the underbody and has strap members 16 extended from the sides thereof and formed to include a hook 18 at the outer ends of the strap. The hooked ends of the straps are received within openings 20 and 22 provided in the brackets 10.

The brackets include a channel section 24 provided within a plate member 26 which is formed to fit the contour of the underbody at the location where it is to be secured.

In practicing the proposed method the bracket 10 is engaged to the underbody 12 with the end of the plate portion 26 thereof disposed adjacent the substantially vertically extending wall portion of the underbody. The bracket is preferably tack welded to the wall, at least at the upper corners thereof as at 28 and 30, to retain the proper relative positioning of the bracket to the wall. An area of both the bracket plate 26 and wall of the underbody 12 are displaced, as by swaging, out of their normal plane and beyond the plane of the other thereof to provide cooperating and elongated shoulder portions 32 and 34, within the plate and wall respectively, and disposed to support the bracket 10 upon the wall. The swaged area 36 is shaped somewhat like the heel of a shoe to provide an elongated and straight edged side 38 wherein shoulders 32 and 34 are formed. The cooperatively disposed shoulders 32 and 34 support the bracket 10 upon the wall and serve to distribute the vertical load stresses of the bracket, and the assembly retained thereto, over a large area of the wall; thereby relieving the weld areas from carrying such load.

The swaged area 36 is next clinched to the wall and bracket members just below the shoulders 32 and 34, which in turn folds the shoulders into a tight double reverse bend, locking the wall and bracket members together as shown by Figure 4.

I claim:

1. The method of fastening a bracket member to a substantially vertical supporting wall member which includes, positioning said bracket and wall member together, forming cooperating shoulders within said bracket and wall members for supporting said bracket upon said wall, and crimping together wall portions of said bracket and wall members adjacent said shoulders for engaging and retaining said shoulders therebetween.

2. The method of fastening a member to a supporting wall which includes, engaging said member with said wall, swaging adjacently disposed areas of said member and wall out of their normal plane to provide cooperating shoulders supporting said member upon said wall, and clinching said shoulders between said members and swaged areas.

3. Support means for retaining a gasoline tank to a vehicle underbody and which includes, a bracket, a tank engaging strap member having a hooked end engaged with said bracket, and a swaged area formed from said bracket and out of the normal plane thereof, said area including a crimped shoulder portion adjacent said strap for engaging and supporting said bracket to a cooperating shoulder portion formed within a substantially vertical side wall of said vehicle underbody.

4. Support means for retaining one member to another in a vertical hanging relation and which includes, a substantially vertical supporting wall member, a bracket member engaged with said wall and having at least the upper corners thereof tack welded to said wall, a swaged area formed from both said wall and said bracket and displaced out of the plane of each and in the same relative direction, said swaged areas including cooperatively disposed elongated shoulder portions for supporting said bracket upon said wall and relieving vertical load stresses from said tack welds, and said shoulder portions being crimped together to retain said shoulders in said cooperatively disposed disposition.

References Cited in the file of this patent

UNITED STATES PATENTS

| | | |
|---|---|---|
| 1,198,885 | Billinghurt | Sept. 19, 1916 |
| 2,053,546 | Anibal | Sept. 8, 1936 |